E. BUNZL.
FRUIT SEED EXTRACTOR.
APPLICATION FILED MAY 3, 1913.

1,083,918. Patented Jan. 13, 1914.

Witnesses:

Inventor:
Eleanor Bunzl.
attorney.

UNITED STATES PATENT OFFICE.

ELEANOR BUNZL, OF NEW YORK, N. Y.

FRUIT-SEED EXTRACTOR.

1,083,918.  Specification of Letters Patent.  Patented Jan. 13, 1914.

Application filed May 3, 1913. Serial No. 765,201.

*To all whom it may concern:*

Be it known that I, ELEANOR BUNZL, a citizen of the United States of America, residing at New York city, borough of Manhattan, county and State of New York, have invented certain new and useful Improvements in Fruit-Seed Extractors, of which the following is a full, clear, and exact description.

This invention relates to an improvement in seeding devices, that is to say, devices which are designed to extract seeds or pits from fruit or vegetables.

The object of my invention is to provide an inexpensive instrument by means of which seeds can be extracted from fruit with a minimum loss of the meat of the fruit.

While my improved device is adapted generally to extract seeds from fruit, it is more especially intended and designed for extracting or cutting the eyes from pineapples, but it is not limited to such use.

To effectually cut the eyes from pineapples, I preferably form the extractor with pointed ends to form a knife-like or cutting element, one of said ends being slightly smaller than the other in order that the said cutting ends will form a shearing device. In other words, when the ends of the extractor are forced into the fruit, and pressed together, the smaller end will pass partly into the larger end, thereby completely separating the eye from the pineapple. As the meat of the pineapple is firm, it is necessary to provide a device that will positively cut.

I will now proceed to describe my invention in detail, the novel features of which I will point out in the appended claims, reference being had to the accompanying drawing, forming part hereof, wherein:—

Figure 1:
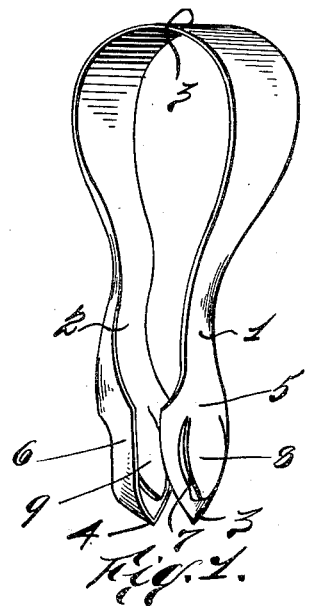
Figure 2:
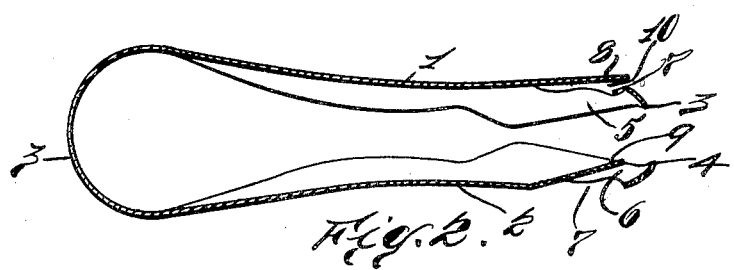
Figure 3:
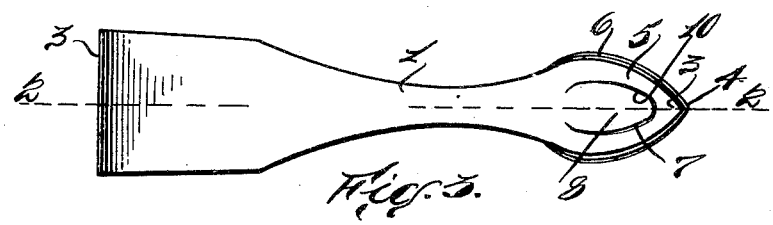

Figure 1 is a perspective view of my extractor; Fig. 2 is a longitudinal sectional view thereof, the section being taken on a line 2—2 in Fig. 3; and Fig. 3 is a plan view of the extractor looking down upon the smaller cutting element.

Referring to the drawing, my improved extractor, as herein illustrated, consists of a plurality of tong or leg-members 1 and 2, joined as at 3. As herein illustrated, the extractor is made from a single strip of resilient material, preferably metal, in order that the members 1 and 2 will spring apart after pressure thereupon has been released. To adapt the extractor for cutting purposes, I provide the members 1 and 2 with pointed or cutting ends 3 and 4, respectively, which are located at the extremitiy of the spoon or dished portions 5 and 6, respectively. Each of the spoon portions 5 and 6 is provided with an opening 7, the spoon portion 5 being still further provided with a tongue 8, and the spoon portion 6 with a tongue 9. By referring to Fig. 2, it will be seen that the tongue 9 is forced inwardly and extends into the spoon portion 6, while the tongue 8 is forced outwardly and extends over the opening 7, but leaving an opening or mouth 10, through which shreds or seeds of fruit may be forced by the opposite tongue 9.

The extractor is used as follows: The pointed ends 3 and 4 are forced into the fruit, the eye being located between the said ends, and the members 1 and 2 pressed together, which action will cause the ends 3 and 4 to cut the meat around the eye. When the ends 3 and 4 are completely closed, the eye will have been completely severed from the fruit. During the closing action of the members 1 and 2, the tongues 8 and 9 will give or spring outwardly, thereby being placed under a certain amount of tension, for the reason that the eye of the fruit will be located in the dished or spoon portions of the extractor and between the said tongues 8 and 9. After the eye has been extracted from the fruit, and after the pressure upon the members 1 and 2 has been released, the eye will fall out of the dished portions 5 and 6, for the reason that the tongues 8 and 9 will react and dislodge the extracted eye. The outwardly extending tongue 8 provides an additional cutting edge when the extractor is forced into the fruit and twisted therein, while the inwardly extending tongue 9 also provides an auxiliary cutting edge, this being advantageous in case the extractor is to be used in fibrous fruit, such as pineapples. It is also preferable to extend one of the tongues outwardly, as shown, because if both were inwardly extended, the mouth formed by the meeting spoon ends when the members 1 and 2 are pressed together would become unduly restricted, which for some purposes would be objectionable, as the tendency would be in squeezing a fruit-pit to force it into the handle. Besides, by the construction shown, larger seeds, such as grape-fruit-seeds, can be more readily and firmly gripped.

I am aware that seed extractors in the form of tongs have heretofore been made;

but as far as I am aware, I am the first to make an extractor in the form herein described and shown.

Having now described my invention, what I claim and desire to secure by Letters Patent, is:

1. A seed extractor consisting of a plurality of members provided with cutting ends, said members being provided with openings adjacent said cutting ends, and tongues located in said openings.

2. A seed extractor consisting of a plurality of members provided with cutting ends, said ends being dished, one being smaller than the other, the smaller being adapted to enter the larger when the extractor members are forced together, said ends being provided with openings, and tongues in said openings.

3. A seed extractor consisting of a plurality of members provided with cutting ends, said ends being dished, one being smaller than the other, the smaller being adapted to enter the larger when the extractor members are forced together, said ends being provided with openings and tongues in said openings, the tongue on the larger dished end being directed inwardly, the tongue on the smaller dished end being directed outwardly.

4. A device of the character described, comprising a pair of resiliently connected tongs, each having a dished cutting end, one of said tongs having an opening in its dished end, and a spring-tongue adjacent said opening.

Signed at New York city, N. Y., this 2nd day of May, 1913.

ELEANOR BUNZL.

Witnesses:
EDWARD A. JARVIS,
RUTH MEYERS.

---

Copies of this patent may be obtained for five cents each, by addressing the "Commissioner of Patents, Washington, D. C."